(12) United States Patent
Gilbert (10) Patent No.: US 11,584,513 B2
(45) Date of Patent: Feb. 21, 2023

(54) OPEN ROTOR BOUNDARY LAYER INGESTION BOOSTER

(71) Applicant: The Boeing Company, Chicago, IL (US)

(72) Inventor: Eric B. Gilbert, Seatle, WA (US)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 16/826,727

(22) Filed: Mar. 23, 2020

(65) Prior Publication Data

US 2021/0291964 A1 Sep. 23, 2021

(51) Int. Cl.
  *B64C 21/00* (2006.01)
  *B64D 27/24* (2006.01)
  *B64D 41/00* (2006.01)
  *B60L 50/40* (2019.01)
  *B64C 25/24* (2006.01)

(52) U.S. Cl.
  CPC .............. *B64C 21/00* (2013.01); *B60L 50/40* (2019.02); *B64C 25/24* (2013.01); *B64D 27/24* (2013.01); *B64D 41/007* (2013.01); *B60L 2200/10* (2013.01); *B64D 2041/002* (2013.01)

(58) Field of Classification Search
  CPC ............ B64D 41/007; B64D 2027/005; B64D 27/24; B64D 2027/026; B64C 21/00
  See application file for complete search history.

(56) References Cited

U.S. PATENT DOCUMENTS

| 2015/0239569 A1* | 8/2015 | Gallet | B64D 27/12 244/54 |
| 2018/0148162 A1* | 5/2018 | Trahmer | B64C 21/06 |
| 2019/0061963 A1 | 2/2019 | Sankrithi | |

OTHER PUBLICATIONS

PW-Allison 578-DX Propfan, https://www.youtube.com/watch?v=Wly5c1InDVs, Oct. 25, 2018, accessed on Mar. 23, 2020.
Prop powered Boeing 727 amazing sound on low level flypast air-to-air, https://www.youtube.com/watch?v=APzO7OVGakw, Jan. 1, 2018, accessed on Mar. 23, 2020.
Unducted Fan MD81—SBAC Farnborough, https://www.youtube.com/watch?v=1BMNaXc1rL8, Mar. 14, 2011, accessed on Mar. 23, 2020.

* cited by examiner

*Primary Examiner* — Timothy D Collins
*Assistant Examiner* — Justin Michael Heston
(74) *Attorney, Agent, or Firm* — Quinn IP Law (57) ABSTRACT

A boundary layer ingestion-open rotor system for use with an aircraft having a fuselage, wings, and an empennage includes an open rotor assembly, one or more energy storage systems, and an electronic control unit (ECU). The open rotor assembly includes fan blades connected to and extending radially from a rotor hub, and a linkage assembly connecting the hub to the fuselage aft of the empennage within a predefined boundary layer of airflow around the fuselage. The energy storage systems are connectable to the rotor hub. In response to an electronic control signal, the system(s) selectively energize the open rotor assembly to cause rotation of the hub to occur within the boundary layer. The ECU selectively generates the electronic control signals to energize the open rotor assembly during one or more predetermined flight operating phases of the aircraft, e.g., cruise, takeoff, landing, and descent.

20 Claims, 5 Drawing Sheets

Take-off & Landing (Gear Down)

| Flight Phase | Thruster Function |
|---|---|
| Gate Power | Ground power provides battery charging and airplane power |
| Taxi-Out | E-taxi with self-pushback – engines off except for warm-up (electric engine start) |
| Take Off | E-boost enables engine derate |
| Descent | Continue glide slope recovery: gear down |
| Landing | Full-Electric Reverse thrust; engines remain at idle |
| Taxi-In | E-taxi: cool engines immediately shut down upon runway exit |

FIG. 7

High Speed (Gear Up)

| Flight Phase | Thruster Function |
|---|---|
| Climb at Top of Climb | E-boost enables engine derate; E-boost increases as turbine lapses |
| Cruise | BLI recovery for wake-drag reduction; runs via engine generators |
| Descent | E-boost for glide slope recovery; engines remain at minimum idle |

FIG. 8

OPEN ROTOR BOUNDARY LAYER INGESTION BOOSTER

BACKGROUND

A fixed-wing aircraft requires sufficient thrust and lift in order to become and remain airborne. Thrust is the collective forces of the aircraft's main propulsors, typically one or more jet engines or propellers. Lift describes the upwardly-directed forces generated by the aircraft in flight, primarily by the aerodynamic effects of the aircraft's airfoil-shaped wings as the aircraft is pushed or pulled through the air by its various propulsors. Flight control surfaces of a modern aircraft can be manually or autonomously adjusted to increase lift, which comes at the expense of increased drag. Other types of drag, including wake drag induced by the boundary layer effect of airflow passing over and around the fuselage of the aircraft, do not provide a corresponding lift benefit, and therefore are considered to be undesirable parasitic drag.

The term "boundary layer" refers to a narrowly-defined band of laminar or turbulent airflow passing over and around an aircraft's external surfaces. Air viscosity and resulting friction slow airflow within the boundary layer, with the greatest effect occurring at an aircraft-airflow interface where local airflow velocity is effectively zero. The boundary layer as it is typically defined extends outward from the above-noted interface to a point at which the ambient airflow reaches about 99% of a mainstream velocity. The thickness of the boundary layer, which is typically quite small, largely depends on the particular construction and airspeed of the aircraft. For example, a trailing edge boundary layer may have a thickness on the order of several centimeters. As a result of the parasitic drag produced by the boundary layer effect on an aircraft in flight, boundary layer physics remains an important consideration in the construction and control of efficient fixed-wing aircraft.

SUMMARY

Disclosed herein is a boundary layer ingestion-open rotor system for use with a fixed-wing aircraft having a fuselage, wings, and an empennage, as well as methods for constructing and methods for using the same. In the present system, an open rotor assembly in the form of an unshrouded multi-bladed prop fan is positioned aft of the empennage within a pre-identified boundary layer around the fuselage. The open rotor assembly is controlled during particular phases of flight, such as a cruise phase, in order to reduce parasitic drag on the aircraft and increase the operating efficiency of the aircraft's main propulsion engines. The open rotor assembly may also be used during other flight phases in either a motoring mode or a generating mode as needed to provide additional functions, including a possible thrust assist function when actively taxiing, taking off, climbing, descending, or landing. These and other benefits of the disclosed system are set forth in detail below with reference to the various Figures.

The open rotor assembly according to an exemplary embodiment includes a plurality of fan blades and a mechanical linkage assembly. Each fan blade is connected to and extends radially from a rotor hub. The mechanical linkage assembly couples the rotor hub to the fuselage aft of the empennage and within the above-noted boundary layer, with some configurations actuating the mechanical linkage assembly using onboard hydraulic and/or electrical power to raise or lower the open rotor assembly as needed.

In an optional embodiment, at least one energy storage system is selectively connected to the rotor hub. Each energy storage system is configured to selectively energize and thereby rotate the rotor hub within the pre-identified boundary layer in response to an electronic control signal. Such a control action occurs in a motoring mode during predetermined flight phases of the aircraft. In such an embodiment, an electronic control unit (ECU) in communication with the energy storage system(s) and with the open rotor assembly selectively transmits the electronic control signal to the energy storage system(s) or to sets of switches in a non-limiting electrical embodiment to thereby energize the open rotor assembly and cause rotation of the rotor hub to occur.

The predetermined flight phase may include a cruise phase in which the aircraft operates at a given altitude with a steady-state velocity or airspeed. Alternatively, the predetermined flight phase may include an active taxiing phase in which the aircraft travels down a runway under its own power subsequent to landing or prior to taking off. The ECU during a post-landing taxiing phase may operate the open rotor assembly as a thrust reversal device in some embodiments.

The energy storage system(s) may optionally include a multi-cell electrochemical battery pack that is configured to be recharged by the engine-driven electric generators and/or the open rotor assembly. The energy storage system(s) may also or alternatively include a supercapacitor bank. In such a configuration, the ECU may be configured to operate the open rotor assembly as an electric generator or wind turbine, such as during a descent phase of flight, to thereby passively recharge the supercapacitor bank. As noted herein, the energy storage system(s) may include a fuel tank or other supply of combustible fuel, with such embodiments extending to gas turbine implementations of the present teachings.

The mechanical linkage assembly may include an articulating linkage assembly in which multiple interconnected links are driven using hydraulic forces provided by the aircraft's main hydraulic system. The articulating linkage assembly in such a configuration may be configured to raise the rotor hub relative to a longitudinal centerline of the fuselage during a landing phase of flight, and to lower the rotor hub toward and align the rotor hub with the longitudinal centerline during a climbing phase and/or during the cruise phase.

The ECU optionally detects deployment of landing gear assemblies of the aircraft and thereafter coordinates raising of the rotor hub with such landing gear deployment. The aircraft may include flight sensors, such as but not necessarily limited to altimeters, inclinometers, inertial sensors, and/or gyroscopes, with the ECU optionally configured to receive flight control signals from the flight sensors, and in response to the flight control signals, to automatically raise or lower the rotor hub via the mechanical linkage assembly.

The open rotor assembly may, in response control signals from the ECU, selectively provide supplemental thrust for propulsion of the aircraft as noted briefly above. The ECU in this non-limiting embodiment may be programmed to command the supplemental thrust from the open rotor assembly during a ground taxiing maneuver.

Also disclosed herein is a fixed-wing aircraft having a fuselage, a pair of wings extending radially from the fuselage, at least one main propulsion engine connected to each of the wings, an empennage attached to the fuselage aft, and a boundary layer ingestion-open rotor system configured as set forth above and attached to the fuselage aft of the empennage.

In various embodiments, the predetermined flight operating phase includes a cruise phase or an active taxiing phase in which the aircraft actively taxis down a runway subsequent to landing thereon. The ECU is configured to operate the open rotor assembly as a thrust reversal device during such an active taxiing phase.

The battery pack and the supercapacitor bank embodiments of the energy storage system(s) may be recharged by the main propulsion engines. In some configurations, the ECU is configured to operate the open rotor assembly as an electric generator or a wind turbine during a descent phase of flight to thereby passively recharge the supercapacitor bank.

The mechanical linkage assembly is an articulating linkage assembly that may be driven by a hydraulic system of the aircraft and configured to automatically raise the rotor hub relative to a longitudinal centerline of the fuselage during takeoff and landing of the aircraft. The open rotor assembly may be configured, in response to the electronic control signals, to selectively provide thrust for propulsion of the aircraft.

A method is also disclosed herein for use with an aircraft having a fuselage, wings, and an empennage. The method in a particular embodiment includes providing an open rotor assembly that is connected to the fuselage aft of the empennage within a predefined boundary layer of airflow around the fuselage via a mechanical linkage assembly. As noted above, the open rotor assembly includes a plurality of fan blades connected to and extending radially from a rotor hub. The method includes receiving flight control signals via an ECU of the aircraft, the flight control signals being indicative of predetermined operating phase of the aircraft.

The method also includes selectively connecting a battery pack and/or a supercapacitor bank to the rotor hub, via the ECU using ON/OFF control of a set of switches, during the predetermined operating phase, and discharging the battery pack and/or the supercapacitor bank to energize the open rotor assembly and thereby cause rotation of the rotor hub to occur within the predefined boundary layer.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and sub-combinations of the elements and features presented above and below.

The present disclosure may be extended to modifications and alternative forms, with representative embodiments shown by way of example in the drawings and described in detail below. Inventive aspects of the disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof.

Figure 1:
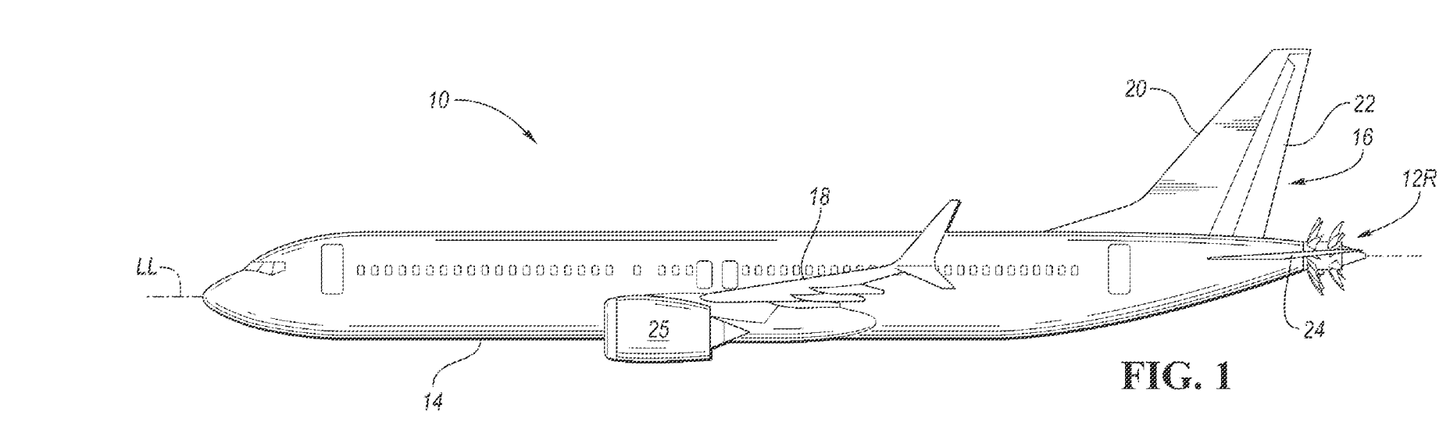
FIGS. 1 and 2 are schematic perspective view illustrations of an exemplary fixed-wing aircraft in two representative phases of flight, with the aircraft having a boundary layer ingestion-open rotor system constructed and controlled as set forth herein.

Referring to the drawings, wherein like reference numbers refer to like features throughout the several views, a fixed-wing aircraft 10 is depicted in FIG. 1 having an open rotor assembly 12R. The open rotor assembly 12R is used as part of a boundary layer ingestion-open rotor system 12, the latter of which is shown schematically in FIGS. 5 and 6. The exemplary aircraft 10 is represented as a twin jet mid-range passenger aircraft in FIGS. 1 and 2 solely for illustration of the present teachings. Larger or smaller embodiments of the aircraft 10 may be envisioned within the scope of the disclosure, with the particular location of one or more main propulsion engines 25 possibly varying with the application.

The aircraft 10 in its various embodiments includes a fuselage 14 with a longitudinal centerline LL. The aircraft 10 also includes a tail assembly or empennage 16 and a pair of wings 18 each connected to and extending radially from the fuselage 14. The empennage 16 in the illustrated embodiment includes various structural components and associated flight control surfaces, including a vertical stabilizer 20 with a main rudder 22 disposed thereon, and horizontal stabilizers 24 with a set of elevators (not shown). Trim tabs (not shown) may also be included as part of the flight control surfaces of the empennage 16 in order optimize control and responsiveness of the aircraft 10 while in flight. Although not visible from the perspectives of FIGS. 1 and 2, the wings 18 likewise include various flight control surfaces situated along the leading and trailing edges of the wings 18 and other surfaces thereof, including flaps, ailerons, spoilers, and slats. Collectively, the flight control surfaces of the aircraft 10 enable the aircraft 10 to maneuver while being propelled through the air by main propulsion engines 25, typically in the form of large gas turbine engines or wing-mounted turbofans.

Figure 2:
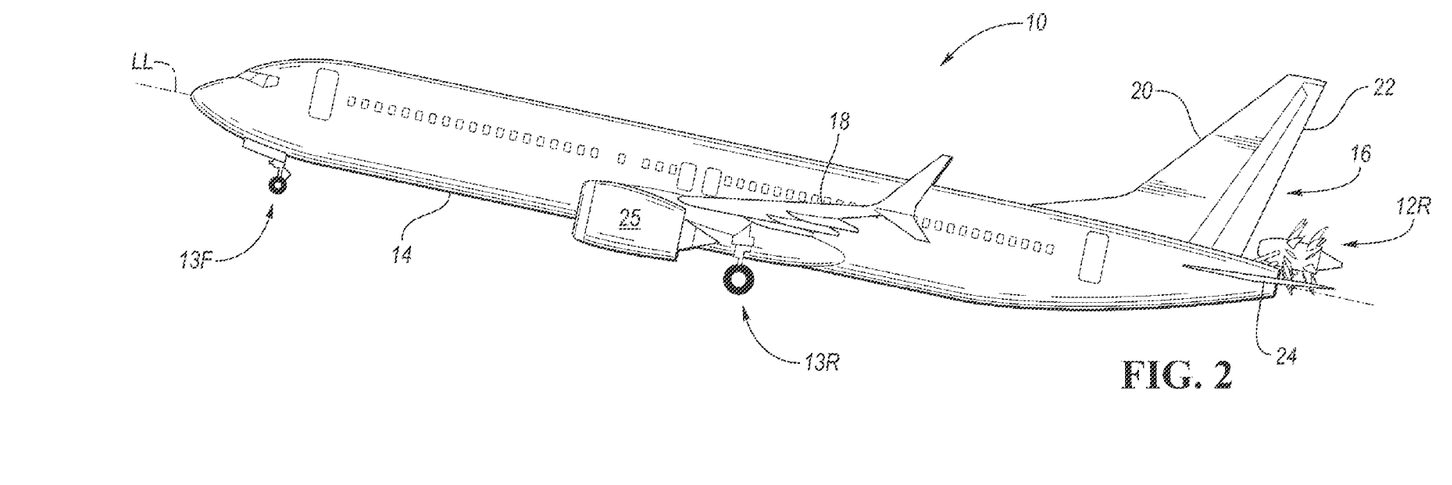

FIGS. 1 and 2 depict two different phases of flight of the representative fixed-wing aircraft 10. In FIG. 1, the aircraft 10 is shown from the side during a steady-state cruise phase. Such a cruise phase is typically reached and sustained once the aircraft 10 levels off at a predetermined altitude and settles into a steady-state airspeed. In the illustrated cruise phase of FIG. 1, front and rear landing gear assemblies 13F and 13R of the aircraft 10, shown in a deployed state in FIG. 2, are fully retracted and stowed within the fuselage 14. The main propulsion engines 25 in a cruise phase are typically throttled back to conserve fuel. During cruise, therefore, the open rotor assembly 12R is positioned along the longitudinal centerline LL of the fuselage 14 aft of the empennage 16 so that the open rotor assembly 12R is situated within the pre-identified boundary layer flowing around the fuselage 14. Such a boundary layer may be pre-identified as part of the present strategy using, for instance, wind tunnel testing, simulation, or other suitable techniques, as will be appreciated by those of ordinary skill in the art.

FIG. 2 depicts the same fixed-wing aircraft 10 during takeoff or landing, i.e., with its landing gear assemblies 13F and 13R fully deployed and main propulsion engines 25 providing propulsive thrust. The pitch of the aircraft 10 during takeoff and landing is such that the open rotor assembly 12R, if left in the position of FIG. 1, could be left vulnerable to contact with a runway surface or other objects in the vicinity of the aircraft 10. Therefore, the open rotor assembly 12R may be configured as set forth below to translate between the representative positions of FIGS. 1 and 2 or anywhere in between.

Figure 5:
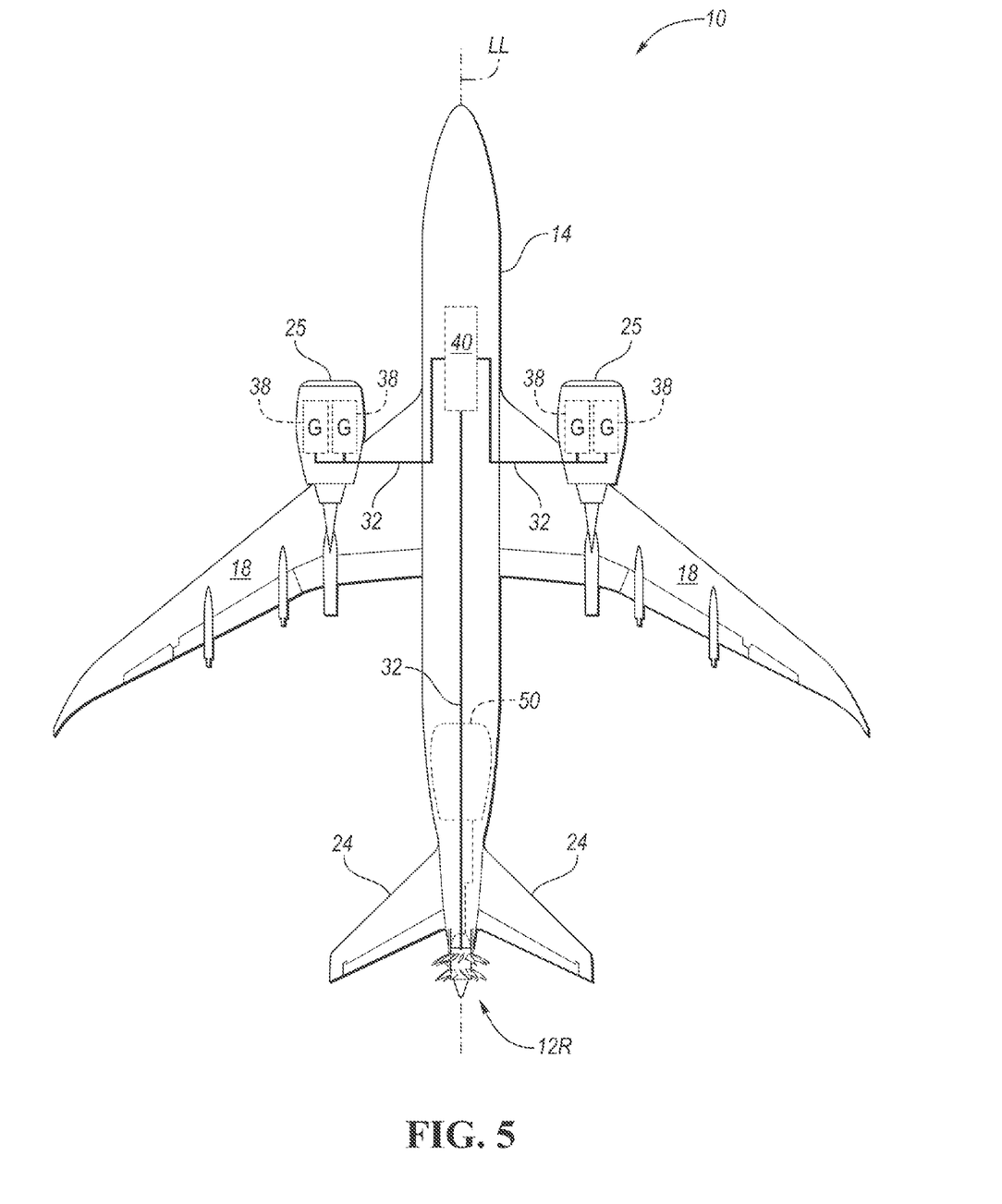
FIG. 5 is a schematic plan view illustration of the exemplary fixed-wing aircraft of FIG. 1 illustrating a possible electrical system configuration.
Figure 6:
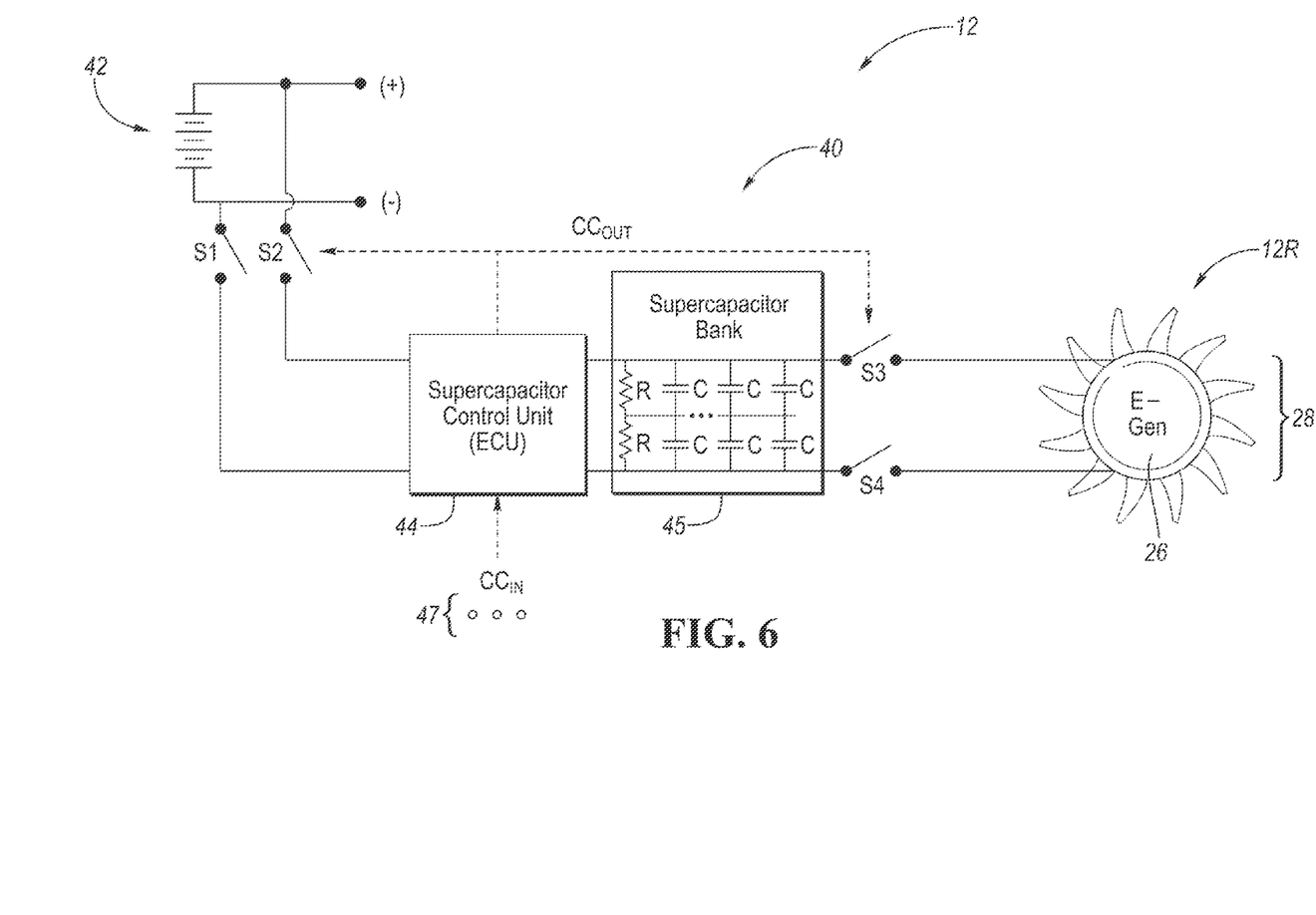
FIG. 6 is a schematic electrical circuit diagram for implementing the exemplary embodiment of FIG. 5.

For example, the position of the open rotor assembly 12R relative to the longitudinal centerline LL of the fuselage 14 may be automatically coordinated with the current deployment state of the landing gear assemblies 13F and 13R, and/or the position relative to the longitudinal centerline LL may be queued by flight sensor data in various embodiments using the flight sensors 47 of FIG. 6. When the landing gear assemblies 13F and 13R are lowered, the open rotor assembly 12R may automatically translate upward, possibly using available hydraulic power from a main hydraulic system 50 of the aircraft 10 (see FIG. 5), so that the open rotor assembly 12R clears the runway by an allowable margin during takeoff and landing. Such a capability may also help improve the performance of a reverse thrust efflux performance as described below.

Figure 3:
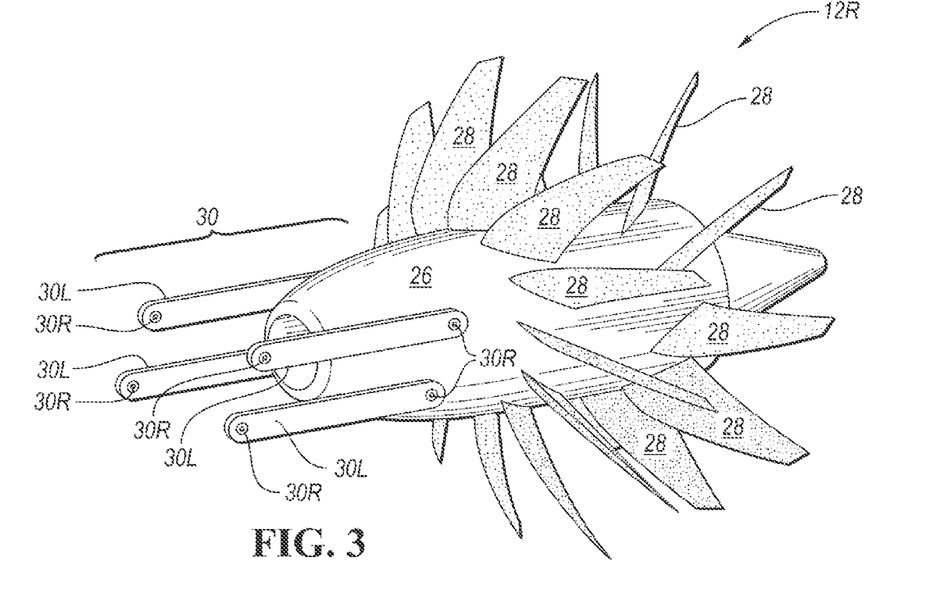
FIGS. 3 and 4 are schematic perspective view illustrations of two different deployed positions of an open rotor assembly usable as part of the system shown in FIGS. 1 and 2.
Figure 4:
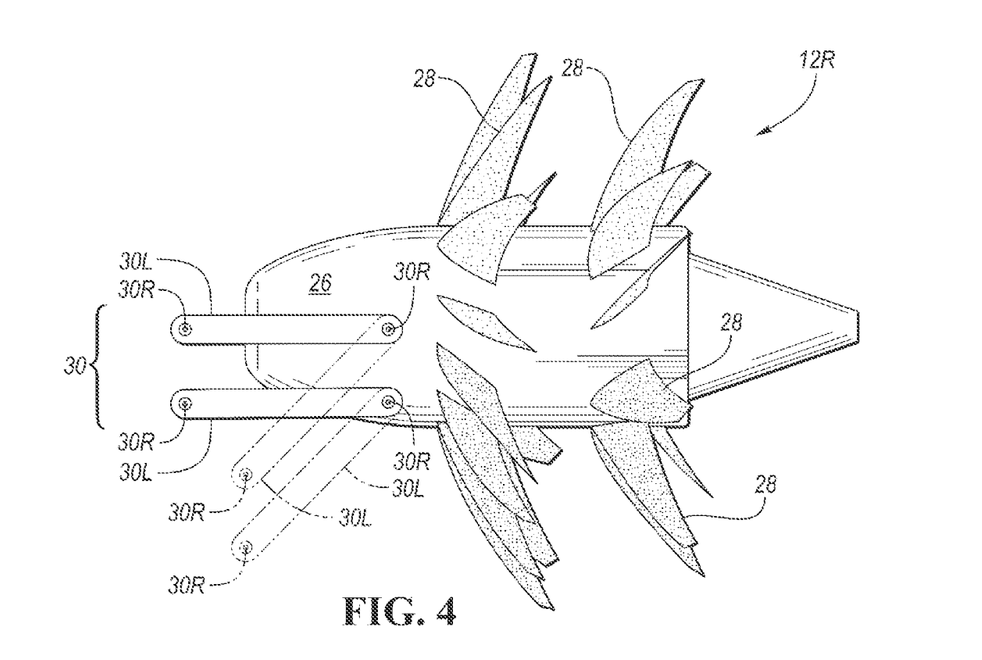

Referring to FIGS. 3 and 4, the open rotor assembly 12R includes a rotor hub 26 and a plurality of fan blades 28. The fan blades 28 are connected to and extend radially outward from the rotor hub 26. A mechanical linkage assembly 30 couples the rotor hub 26 to the fuselage 14 aft of the empennage 16 as best shown in FIGS. 1 and 2. Coupling of the open rotor assembly 12R to the fuselage 14 occurs within a predefined boundary layer of airflow around the aircraft 10, with boundary layer physics well understood in the aeronautical arts and described in general hereinabove. The mechanical linkage assembly 30 may be configured as an articulated linkage assembly as shown in order to enable the open rotor assembly 12R to be fully raised (FIG. 4) or lowered (FIG. 3) relative to the centerline LL as needed. To that end, the number of linkages 30L and revolute joints 30R of the mechanical linkage assembly 30 may vary within the scope of the application. The power required for raising or lowering the open rotor assembly 12R may be provided, as noted above, by onboard hydraulic pressure lines of the main hydraulic system 50 of FIG. 5 in some embodiments to take advantage of available onboard power.

The system 12 described in detail herein is intended to ingest and recapture energy from the pre-identified boundary layer around the fuselage 14, and to erase some of the boundary layer-induced parasitic drag on the aircraft 10. As will be appreciated by those of ordinary skill in the art, open rotors or turboprops are generally considered to be more energy efficient than shrouded turbofans of the types typically used as the main propulsion engines 25 of FIGS. 1 and 2. However, open rotor configurations also tend to be relatively noisy, and thus the depicted position of the open rotor assembly 12R aft of the empennage 16 may help reduce noise as perceived within the aircraft 10. Additionally, the adjustable pitch of the fan blades 28 of FIGS. 3 and 4 enables pitch to be modified or feathered in flight based on the present airspeed and altitude of the aircraft 10, unlike shrouded inductive fans, which in turn provides distinct passive charging or generating advantages as described below.

Referring to FIG. 5, active rotation of the open rotor assembly 12R may, in some embodiments, be electrically powered via an onboard electrical system 40. A typical aircraft may include an auxiliary power unit (APU) (not shown), which is used to generate onboard electrical power via the combustion of jet fuel. Power from an APU may be used at the gate or selectively during other flight phases to generate onboard electricity, albeit at the cost of reduced fuel efficiency. The electrical system 40 of FIG. 5, which may be used to eliminate or at least reduce the size and/or usage of such an APU, is electrically connected via transfer conductors 32 to a set of engine-mounted or wing-mounted electric generators (G) 38, as well as to the open rotor assembly 12R located at the rear of the fuselage 14.

Different electrical functions aboard the fixed-wing aircraft 10 of FIG. 5 may require the supply of electrical energy from the electrical system 40. Onboard systems requiring electrical power range from flight sensors and avionics, cabin lighting and passenger infotainment systems, heating and cooling systems for regulating the temperature of the passenger cabin, or heating/cooling functions required for in-flight food and beverage service, etc. A particularly energy-intensive electrical load is that of in-flight de-icing or anti-icing systems. As a result of the periodically high loads imposed by these and other possible electrical loads aboard the aircraft 10, the exemplary electrical system 40 is typically sized for a worst-case demand scenario. However, as wing de-icing and other energy-intensive functions are not always performed, ample opportunity remains for the electrical system 40 to take advantage of possible energy reserves in order to selectively energize the present boundary layer ingestion functions. That is, the electrical system 40 may be configured to load manage, with motoring functions of the open rotor assembly 12R being performed when sufficient electrical energy or state of charge is present in the electrical system 40 to do so. Likewise, generating modes may be commanded when the state of charge is lower than an allowable threshold.

Additionally, the system 12 and its ability to passively charge the electrical system 40 during certain flight phases may reduce or eliminate the need for energy-intensive thrust reversal functions of the type ordinarily performed by the main propulsion engines 25. For example, a pilot or an onboard flight controller may execute a thrust reversal maneuver to thereby cause the main propulsion engines 25 to redirect engine exhaust during landing maneuvers in order to rapidly reduce ground speed. As thrust reversal maneuvers consume large amounts of fuel, selective thrust reversal capabilities of the present system 12 may be used to reduce or eliminate engine-based thrust reverse aboard the disclosed aircraft 10.

Referring to FIG. 6, the electrical system 40 according to a possible embodiment includes at least one energy storage system, with two energy storage systems depicted as a representative high-energy multi-cell battery pack 42 and a supercapacitor bank 45. As noted below, non-electrical embodiments may be envisioned within the scope of the disclosure in which the energy in the energy storage system(s) is s store of chemical energy, e.g., a supply of combustible diesel/kerosene-based aviation fuel such as Jet-A, Jet-A1, Jet-B, etc., or which may be used when the open rotor assembly 12R is alternatively embodied as an open rotor gas turbine. In the illustrated electrical embodiment, the battery pack 42 and the supercapacitor bank 45 are connected across positive (+) and negative (−) rails of a direct current voltage bus. The individual battery cells of the battery pack 42 may be variously configured as rechargeable battery cells of an aviation-suitable battery chemistry, e.g., lithium-ion or another battery chemistry providing the requisite energy density for performing the tasks described herein. The energy storage system(s) are electrically or mechanically connectable to the rotor hub 26 in different embodiments, and are configured to discharge or otherwise release energy in response to control signals to thereby selectively rotate the rotor hub 26 within the predefined boundary layer.

Although omitted for illustrative simplicity, the open rotor assembly 12R may be configured as a rotary electric machine that rotates when energized by the controlled discharge of the battery pack 42 and/or the supercapacitor bank 45. Different embodiments of the open rotor assembly 12R may be envisioned within the scope of the present disclosure, including but not limited to brushless or brush-type DC motors or polyphase machines, e.g., permanent magnet-based or induction-based machines. For polyphase machines, one of ordinary skill in the art will appreciate that DC power supplied by the battery pack 42 and/or the supercapacitor bank 45 must first be inverted to an AC voltage, typically using pulse width modulation or other high-speed switching control of an inverter module (not shown). Therefore, the circuit topology of FIG. 6 is intended to be illustrative of aspects of the present teachings, particularly with respect to the structure and function of the battery pack 42 and the supercapacitor bank 45, without limiting the scope of the disclosure to a particular motor/generator construction of the open rotor assembly 12R.

Connection/disconnection of the energy storage systems of FIG. 6 respectively to or from the open rotor assembly 12R, shown as an electrical generator (E-Gen) in the illustrated embodiment, occurs in response to electronic control signals (arrow $CC_{OUT}$). The electronic control signals (arrow $CC_{OUT}$) are generated and transmitted by an electronic control unit (ECU) 44 of the electrical system 40 during one or more predetermined phases of flight. The electronic control signals (arrow $CC_{OUT}$) may be used to open or close high-voltage solid state or mechanical switches S1, S2, S3, and S4 as needed in order to respectively disconnect or connect the battery pack 42 and/or the supercapacitor bank 45 from or to the open rotor assembly 12R.

For instance, the switches S1 and S2 upstream of the ECU 44 may be commanded open as shown to automatically disconnect the battery pack 42 and thus prevent energy from passing to or from the battery pack 42. In a similar manner, the switches S3 and S4 may be commanded open as shown to disconnect the supercapacitor bank 45. The switches S1 and S2 may be commanded closed to reconnect the battery pack 42, while the S3 and S4 are commanded closed to reconnect the supercapacitor bank 45. Additional switches or a different switching topology may be used to achieve the desired ends, and thus the topology of FIG. 6 is non-limiting and representative of the present teachings.

In the illustrated configuration, the battery pack 42 and/or the open rotor assembly 12R may be used to electrically charge an application-suitable number of capacitors (C) housed within the supercapacitor bank 45. The capacitors (C) are connected in electrical parallel with multiple resistors (R) and possibly other electromagnetic interference or other signal filtering components, as will be appreciated by those of ordinary skill in the art. A supercapacitor bank 45 constructed in this manner may be used for various purposes aboard the aircraft 10, including use as a reliable reserve of electrical power to quickly energize onboard systems in the event of transient voltage dips or high load periods.

The ECU 44, which is also labeled "Supercapacitor Control Unit" in FIG. 6, is in communication with the energy storage system(s) and the open rotor assembly 12R, e.g., over hardwired differential voltage lines or another suitable wired or wireless connection. The ECU 44 is configured to selectively transmit the electronic control signals (arrow $CC_{OUT}$) to the energy storage system(s) to thereby energize the system 12 during the one or more predetermined flight phases of the aircraft 10 shown in FIGS. 1 and 2.

While depicted as a unitary control module for simplicity, the ECU 44 may be physically embodied as one or more electronic control units or nodes each with application-sufficient memory and one or more processors, associated hardware and software such as a clock, timer, input/output circuitry, buffer circuitry, and the like. Memory may include sufficient amounts of read only memory, for instance magnetic or optical memory. Instructions embodying a control method may be programmed as computer-readable instructions and executed during operation of the aircraft 10. The term "ECU" may include one or more control modules, logic circuits, Application Specific Integrated Circuits (ASICs), central processing units, microprocessors, or other hardware as needed to provide the programmed functionality described herein.

It is expected that transient operation of the system 12 of the present disclosure, during the indicated phases of flight and for the purposes and durations noted herein, should require relatively low power consumption levels. Electrical energy provided by operation of the main propulsion engines 25 is relatively expensive to produce, requiring as it does the combustion of substantial amounts of jet fuel. When the aircraft 10 levels off into cruise as depicted in FIG. 1, the main engines 25 of the aircraft 10 are typically throttled back to conserve fuel. During such a time, the open rotor assembly 12R may be operated as an electric motor that intermittently draws low power from the battery pack 42 of FIG. 5.

For example, during cruise the open rotor assembly 12R may be driven at relatively low power by operation of engine generators 38 of FIG. 5, which are typically located on and driven by the main engines 25. During such a flight phase, rotation of the open rotor assembly 12R within the boundary layer formed around the fuselage 14 counteracts boundary layer-induced wake drag. That is, the energized open rotor assembly 12R rotates within the boundary layer aft of the empennage 16 of FIGS. 1 and 2 to cancel out parasitic drag. Likewise, the open rotor assembly 12R may be triggered to operate as an electric generator in other modes, such as during descent of the aircraft 10. During such a generating mode, the airflow-induced passive rotation of the blades 28 and the connected rotor hub 26 may enable the open rotor assembly 12R to function as a wind turbine, with such passive rotation used to generate electricity for recharging the supercapacitor bank 45 and/or the individual battery cells of the battery pack 42.

Figure 7:
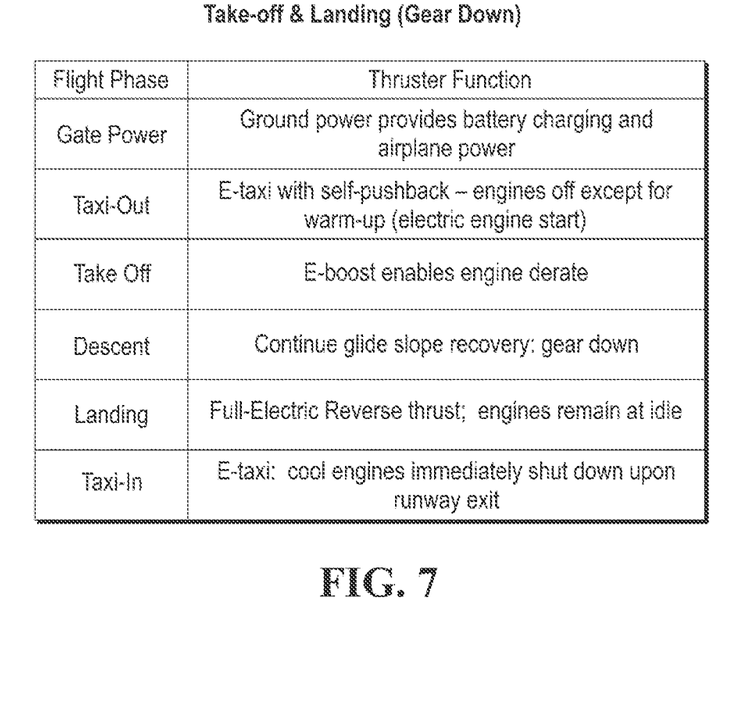
FIGS. 7 and 8 are tables describing respective gear-down and gear-up flight phases.
Figure 8:
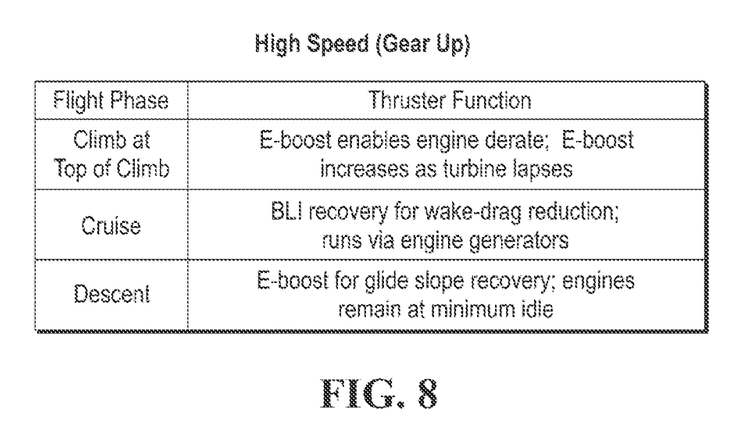

Referring to FIGS. 7 and 8, the system 12 and open rotor assembly 12R described above with reference to FIGS. 1-6 lends itself to beneficial use in various phases of flight of the aircraft 10. For instance, forward thrust from the open rotor assembly 12R may be used during the take-off and landing operations labeled as "gear down" phases in FIG. 7. When the aircraft 10 is parked at the gate of a passenger terminal, for example, electrical power to the aircraft 10 may be provided by the grid or a mobile power cart (not shown) to provide the necessary battery charging and onboard auxiliary power, and/or such power may be provided in part by the APU noted above. Thrust from the open rotor assembly 12R could be used to assist with gate-push and subsequent taxi-out maneuvers in lieu of a conventional "tractor pull" operation in which the aircraft 10 is towed away from the gate by another vehicle.

During a taxi-out phase in which the aircraft 10 moves away from the gate into a pre-flight position on a runway, the system 12 may act as an electric taxi (e-taxi) to help provide self-pushback, i.e., to enable the aircraft 10 to move itself into position on the runway without consuming valuable fuel. The main engines 25 may remain off, with the exception of requisite engine warm-up functions and possible engine start functions enabled by the above-noted APU. High-load conditions such as de-icing may require the main engines 25 of the aircraft 10 to run during taxiing phases to ensure sufficient power for energizing de-icing/anti-icing functions. Thus, the various functions of the system 12 described herein may be used where needed or appropriate depending on other competing aircraft loads. During take-off, the open rotor assembly 12R may be operated as an electric motor to provide some of the required propulsive thrust, thereby assisting the main engines 25. Accordingly, this optional use may enable downsizing or de-rating of the main engines 25.

Active descent of the aircraft 10 subsequent to cruise is another "gear down" phase in which the aircraft 10 of FIGS. 1 and 2 glides toward the runway at low levels of engine power. As noted above, the open rotor assembly 12R may feather its propeller blades 28 during such a phase to enable the open rotor assembly 12R to operate as a turbine or an electric generator, thereby recovering the requisite electrical energy for charging the battery pack 42 and/or the supercapacitor bank 45. When landing, the open rotor assembly 12R may draw power from the battery pack 42 and/or the supercapacitor bank 45 so as to provide a full-electric reverse thrust function. Thrust reverse would serve to discharge the supercapacitor bank 45 and thus drive the open rotor assembly 12R in a full-power thrust reverse mode, e.g., 2.5 MW for several seconds in an exemplary twin engine embodiment of the aircraft 10. The main engines 25, which are ordinarily tasked with performing such energy-intensive thrust reversal functions, may remain at idle when using the present system 12, thereby improving fuel efficiency of the main engines 25. In other words, the thrust reversal function of the main engines 25 may be reduced or eliminated as a benefit of integrating the present teachings into the construction of the aircraft 10.

Upon landing, the aircraft 10 may actively taxi (taxi-in) to the gate using the system 12 in the E-taxi mode. Pitch and power adjustments to the open rotor assembly 12R can quickly correct glide slope, with the main engines 25 left largely unused or idle for much of the descent, landing, and taxiing phases. As such, the cores of the main engines 25 should remain sufficiently cool, thereby enabling immediate shut down of the engines 25 upon exiting the runway.

Referring to FIG. 8, high speed "gear up" phases of flight can also benefit from the present teachings. During a climb phase, for instance, and in particular at the top of the climb, the system 12 may be operated in an E-boost mode to assist the thrust of the main engines 25, thus enabling the main engines 25 to be de-rated as noted above with reference to the take-off phase. During cruise, the open rotor assembly 12R may be powered by controlled discharge of the battery pack 42 and/or the supercapacitor bank 45, and/or by operation of the engine generators 38 of FIG. 5, in order to perform boundary layer ingestion recovery efforts and reduce parasitic wake drag.

Although nothing precludes manual activation and pilot control of the open rotor assembly 12R, it is envisioned that the open rotor assembly 12R would be powered autonomously and intermittently during cruise, and with relatively lower power requirements, e.g., about 300 kW-500 kW for a typical medium-range twinjet passenger aircraft embodiment of the aircraft 10. High-speed descent may also benefit from assist by the open rotor assembly 12R in an E-boost mode similar to the landing phase described above and shown in FIG. 6, with the main engines 25 possibly remaining at minimum idle during such a phase.

The system 12 described above may be used as part of a flight control method to enable the above-described benefits to be realized during flight. For instance, an aircraft such as the aircraft 10 of FIGS. 1 and 2 may be provided having the system 12 of FIGS. 1-6. In such an embodiment, the energy storage system(s), i.e., the battery pack 42 and/or the supercapacitor bank 45 of FIG. 6, may be electrically connected to the rotor hub 26 and commanded to selectively rotate the rotor hub 26 within the predefined boundary layer around the fuselage 14. This may occur automatically in response to receiving flight control signals, e.g., the electronic control signals (arrow $CC_{IN}$ of FIG. 6), during one or more predetermined flight phases of the aircraft 10, with such signals being indicative of predetermined operating phase of the aircraft 10.

The method may include selectively connecting a battery pack 42 and/or the supercapacitor bank 45 to the rotor hub 26, via the ECU 44 using ON/OFF control of a set of switches S1, S2, S3, S4, during the predetermined operating phase. The method thus includes discharging the battery pack 42 and/or the supercapacitor bank 45 to energize the open rotor assembly 12R and thereby cause rotation of the rotor hub 12R to occur within the predefined boundary layer.

As part of the described method, for example, the electronic control signals (arrow $CC_{IN}$) may be indicative of the predetermined flight phase(s), such as a particular altitude, attitude, and airspeed of the aircraft 10, with at least some of the electronic control signals (arrow $CC_{IN}$) possibly generated and provided by the flight sensors 47 noted above and shown in FIG. 6. The ECU 44 may selectively transmit the electronic control signals (arrow $CC_{OUT}$) to the individual switches (S1 and S2) and/or (S3 and S4) to energize the open rotor assembly 12R during the one or more predetermined flight phases, with exemplary phases depicted in FIGS. 7 and 8 and described above. The electronic control signals (arrow $CC_{IN}$) may also include a present deployment state of the landing gear 13F and 13R of FIG. 2, as noted above, thereby enabling coordination of the motoring or generating functions of the open rotor assembly 12R with the deployment of the landing gear 13F and 13R.

Battery electric energy storage has the ability to displace some of the existing fuel use aboard aircraft for various purposes, including power generation and propulsion. Using the present teachings, electric thruster functions may be selectively provided by the electrically-driven open rotor assembly 12R located in an aft-most portion of the fuselage 14 as shown in FIGS. 1 and 2. The disclosed system 12 is tightly integrated with the electrical system 40 of the aircraft 10 in order to minimize the size of the onboard battery pack 42 of FIG. 6, while at the same time maximizing the functional value of the system 12 and related fuel savings.

A primary drawback to battery electric propulsion in the aviation industry remains the size and weight of energy storage systems used aboard the aircraft, which tends to have low specific energy with relation to fuel. By focusing on limiting battery use to short bursts of power in the present application, benefits may be realized in longer-range flight operations, whether used solely for reducing parasitic drag or for situationally supplementing or replacing thrust from the main engines 25. The present teachings likewise enable purely electric implementations in the far-aft of the aircraft 10, with variable geometry of the blades 28 and adjustability of the location of the open rotor system 12R relative to the longitudinal centerline LL of FIGS. 1 and 2 as set forth above.

While electric embodiments described herein have the above-noted and possibly other benefits, combustible fuel-based alternatives exist when electrification is not possible or practicable to implement on a given aircraft. For instance, an electrically-driven embodiment of the open rotor assembly 12R as described above may be replaced by a gas turbine powerplant to similar effect, in which the energy storage system(s) shown as the battery pack 42 and supercapacitor bank 45 of FIG. 6 are embodied as aviation fuel tanks. Gas turbine embodiments may be implements to similarly perform the above-described boundary layer ingestion (BLI) thrust production or BLI recovery/wake drag reduction, as well as ground taxiing reverse thrust functions. When taxiing, for instance, the use of a smaller open/unshrouded aviation fuel-powered prop fan in the boundary layer could provide some level of fuel savings. Other disclosed modes such as gate pushback could likewise be powered by a small aviation fuel-powered prop fan embodiment of the open rotor assembly 12R within the scope of the disclosure. While certain components of the electrical system 40 of FIG. 6 would not be needed in such an alternative embodiment, some of the attendant benefits described herein would still be realized. These and other possible alternative configurations and benefits will be readily appreciated by one of ordinary skill in the art in view of the foregoing disclosure.

Aspects of the present disclosure have been described in detail with reference to the illustrated embodiments. Those skilled in the art will recognize, however, that certain modifications may be made to the disclosed structure and/or methods without departing from the scope of the present disclosure. The disclosure is also not limited to the precise construction and compositions disclosed herein. Modifications apparent from the foregoing descriptions are within the scope of the disclosure as defined by the appended claims. Moreover, the present concepts expressly include combinations and sub-combinations of the preceding elements and features.

What is claimed is:

1. A boundary layer ingestion-open rotor system for use with an aircraft having a fuselage and an empennage, comprising:
    an open rotor assembly having a rotor hub, a plurality of fan blades connected to and extending radially from the rotor hub, and a mechanical linkage assembly connecting the rotor hub to the fuselage aft of the empennage within a predefined boundary layer of airflow around the fuselage;
    one or more energy storage systems each being connectable to the rotor hub, and each being configured, in response to an electronic control signal, to selectively energize the open rotor assembly to cause rotation of the rotor hub within the predefined boundary layer, wherein the one or more energy storage systems includes a battery pack and a supercapacitor bank; and
    an electronic control unit (ECU) in communication with the one or more energy storage systems and the open rotor assembly, wherein the ECU is configured to selectively generate the electronic control signal to energize the open rotor assembly via the one or more energy storage systems during one or more predetermined flight operating phases of the aircraft, and wherein the one or more predetermined flight operating phases include a cruise phase;
    wherein the ECU is configured to close a switch between the open rotor assembly and the supercapacitor bank depending on a selected one of the predetermined flight operating phases;
    wherein the ECU is configured to operate the open rotor assembly as an electric generator or a wind turbine during a descent phase of flight, wherein passive rotation of the fan blades and the rotor hub during the descent phase generates electricity to passively recharge the supercapacitor bank via the ECU closing the switch between the open rotor assembly and the supercapacitor bank.

2. The system of claim 1, wherein the aircraft includes a plurality of propulsion engines, and the battery pack and the supercapacitor bank are configured to be recharged by the propulsion engines.

3. The system of claim 2, wherein the one or more predetermined flight operating phases include an active taxiing phase in which the aircraft actively taxis down a runway subsequent to landing thereon, and wherein the ECU is configured to operate the open rotor assembly as a thrust reversal device during the active taxiing phase.

4. The system of claim 1, wherein the mechanical linkage assembly is an articulating linkage assembly driven by a hydraulic system of the aircraft and configured to automatically raise the rotor hub relative to a longitudinal centerline of the fuselage during takeoff and landing of the aircraft.

5. The system of claim 1, wherein the aircraft includes landing gear assemblies, and wherein the ECU is configured to detect deployment of the landing gear assemblies and thereafter coordinate raising of the rotor hub with the deployment of the landing gear assemblies.

6. The system of claim 1, wherein the aircraft includes flight sensors, and the ECU is configured to raise the rotor hub via the mechanical linkage assembly in response to data from the flight sensors.

7. The system of claim 1, wherein the open rotor assembly is configured, in response to the electronic control signal, to selectively provide thrust for propulsion of the aircraft.

8. The system of claim 7, wherein the ECU is configured to command the thrust from the open rotor assembly during a ground taxiing maneuver of the aircraft.

9. An aircraft comprising:
a fuselage;
a pair of wings extending radially from the fuselage;
at least one main propulsion engine connected to each of the wings and the at least one main propulsion engine of each of the wings includes an electric generator;
an empennage attached to the fuselage aft; and
a boundary layer ingestion-open rotor system attached to the fuselage aft of the empennage, and including:
  an open rotor assembly having a rotor hub, a plurality of fan blades connected to and extending radially from the rotor hub, and a mechanical linkage assembly connecting the rotor hub to the fuselage aft of the empennage within a predefined boundary layer of airflow around the fuselage; and
  an electrical system connected to the open rotor assembly and including an electronic control unit (ECU), first and second sets of switches, and a battery pack and a supercapacitor bank each being separate from the electric generator of the at least one main propulsion engine, and wherein the battery pack and the supercapacitor bank are each electrically connectable to the rotor hub via the first and second sets of switches, respectively, and each of the battery pack and the supercapacitor bank being configured, in response to an electronic control signal, to selectively energize the open rotor assembly to cause rotation of the rotor hub within the predefined boundary layer;
wherein the ECU is configured to selectively generate the electronic control signal to energize the open rotor assembly during one or more predetermined flight operating phases of the aircraft, and wherein the at least one main propulsion engine of each of the wings are wing-mounted turbofans.

10. The aircraft of claim 9, wherein the one or more predetermined flight operating phases includes a cruise phase.

11. The aircraft of claim 9, wherein the one or more predetermined flight operating phases includes an active taxiing phase in which the aircraft actively taxis down a runway subsequent to landing thereon, and wherein the ECU is configured to operate the open rotor assembly as a thrust reversal device during the active taxiing phase.

12. The aircraft of claim 9, wherein the battery pack and the supercapacitor bank are configured to be recharged by the electric generator of the at least one main propulsion engine of each of the wings.

13. The aircraft of claim 9, wherein the ECU is configured to operate the open rotor assembly as an electric generator or a wind turbine during a descent phase of flight to passively recharge the supercapacitor bank.

14. The aircraft of claim 9, wherein the mechanical linkage assembly is an articulating linkage assembly driven by a hydraulic system of the aircraft and configured to automatically raise the rotor hub relative to a longitudinal centerline of the fuselage during takeoff and landing of the aircraft.

15. The aircraft of claim 9, wherein the open rotor assembly is configured, in response to the electronic control signal, to selectively provide thrust for propulsion of the aircraft.

16. A method for use with an aircraft having a fuselage, wings, and an empennage, wherein at least one main propulsion engine is connected to each of the wings and the at least one main propulsion engine includes an electric generator, the method comprising:
  providing an open rotor assembly that is connected to the fuselage aft of the empennage within a predefined boundary layer of airflow around the fuselage via a mechanical linkage assembly, wherein the open rotor assembly includes a plurality of fan blades connected to and extending radially from a rotor hub; and
  receiving flight control signals via an electronic control unit (ECU) of the aircraft, the flight control signals being indicative of a predetermined operating phase of the aircraft;
  selectively connecting an energy storage system to the rotor hub, via the ECU using ON/OFF control of a set of switches, during the predetermined operating phase, wherein the energy storage system includes a battery pack and/or a supercapacitor bank which is separate from the electric generator of the at least one main propulsion engine; and
  energizing the open rotor assembly via the battery pack and/or the supercapacitor bank to cause rotation of the rotor hub within the predefined boundary layer.

17. The method of claim 16, wherein the predetermined operating phase includes one or more of a landing phase, an active taxiing phase, and a gate push maneuver.

18. The method of claim 16, wherein selectively connecting the energy storage system to the rotor hub further comprises: passively rotating the rotor hub as a wind turbine during a descent phase of the aircraft to generate electricity for recharging the battery pack and/or the supercapacitor bank.

19. The method of claim 16, wherein energizing the open rotor assembly further comprises: energizing the open rotor assembly via operation of the electric generator of the at least one main propulsion engine and via discharge of the battery pack and/or the supercapacitor bank when the ECU indicates the predetermined operating phase is a cruise phase.

20. The system of claim 1, wherein the aircraft includes a plurality of propulsion engines each having an electric generator, wherein the electric generator of the propulsion engines is separate from the battery pack and the supercapacitor bank, and wherein the battery pack and the supercapacitor bank are configured to be recharged by the electric generator of the propulsion engines.

* * * * *